United States Patent [19]

Magnuson

[11] Patent Number: 5,235,884

[45] Date of Patent: Aug. 17, 1993

[54] PUNCH PRESS SLUG REMOVAL SYSTEM

[75] Inventor: James M. Magnuson, Kankakee, Ill.

[73] Assignee: Peddinghaus Corporation, Bradley, Ill.

[21] Appl. No.: 837,212

[22] Filed: Feb. 18, 1992

[51] Int. Cl.⁵ .............................................. B26D 7/18
[52] U.S. Cl. .................................... 83/100; 83/24; 83/165; 83/167; 83/DIG. 2
[58] Field of Search ....................... 83/24, DIG. 2, 100, 83/165, 167

[56] References Cited

U.S. PATENT DOCUMENTS

| | | | |
|---|---|---|---|
| 2,364,011 | 11/1944 | Wales | 83/165 X |
| 2,487,559 | 11/1949 | Boyle | 83/100 |
| 2,707,028 | 4/1955 | Burton | 83/100 |
| 3,041,905 | 7/1962 | Gabriel | 83/100 |
| 3,800,643 | 4/1974 | Scott et al. | 83/100 |
| 4,249,436 | 2/1981 | Clay | 83/167 X |
| 4,872,381 | 10/1989 | Stroms | 83/100 X |
| 5,063,804 | 11/1991 | Magnuson | 83/368 |
| 5,111,723 | 5/1992 | Andrush et al. | 83/24 |

Primary Examiner—Douglas D. Watts
Assistant Examiner—Kenneth E. Peterson
Attorney, Agent, or Firm—Vessler, Goldsmith, Shore, Sutker & Milnamow, Ltd.

[57] ABSTRACT

An apparatus and method are provided for removing slugs from punch presses. A vacuum system is provided for the die portion of a punch press used to punch the upper flange of a beam. The vacuum system carries the slugs to a remote deposit location. A collection pan is provided for collecting slugs form a lower flange punch press and from a web punch press. A vacuum removal system carries the collected slugs from the pan to the remote deposit location.

7 Claims, 7 Drawing Sheets

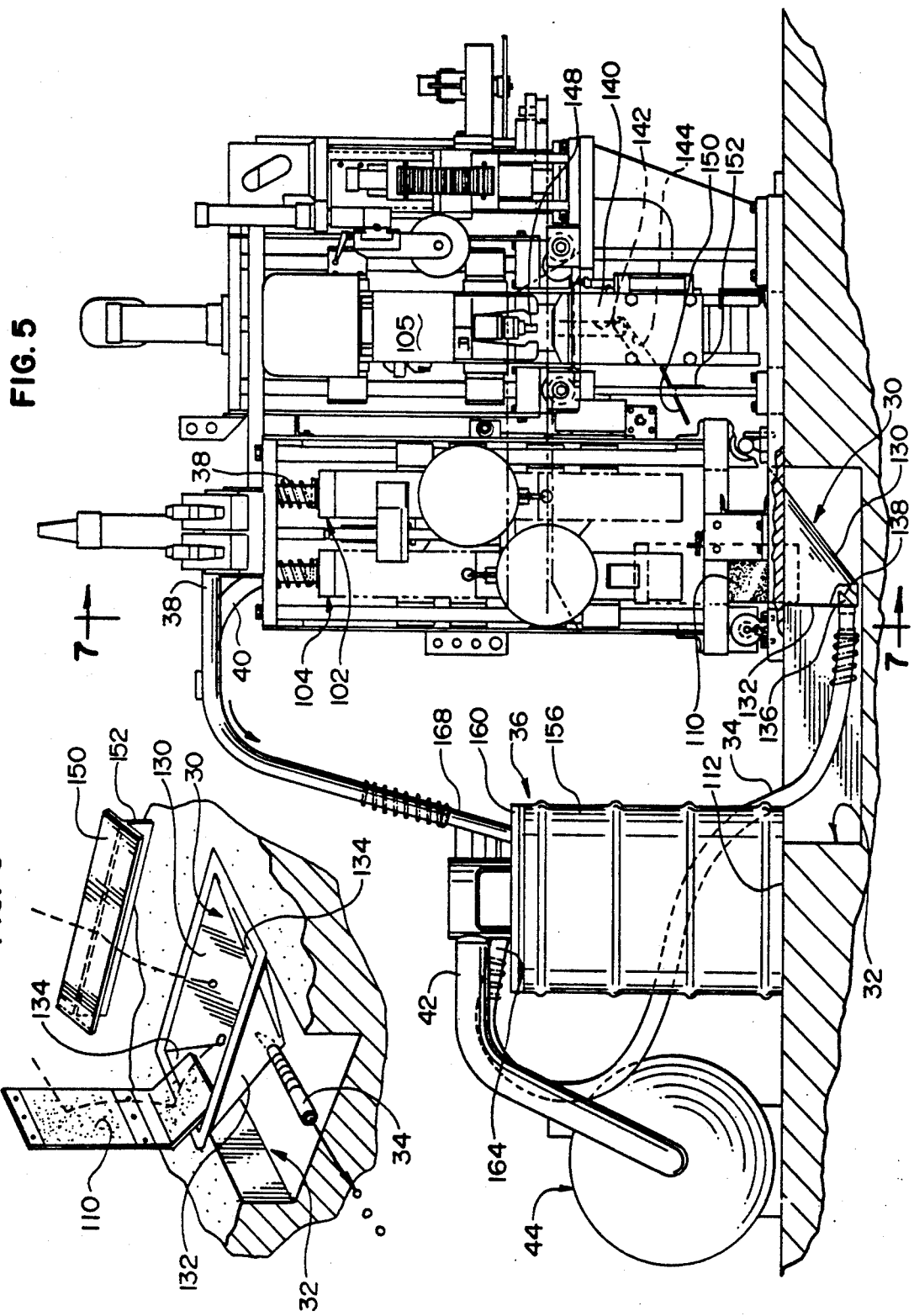

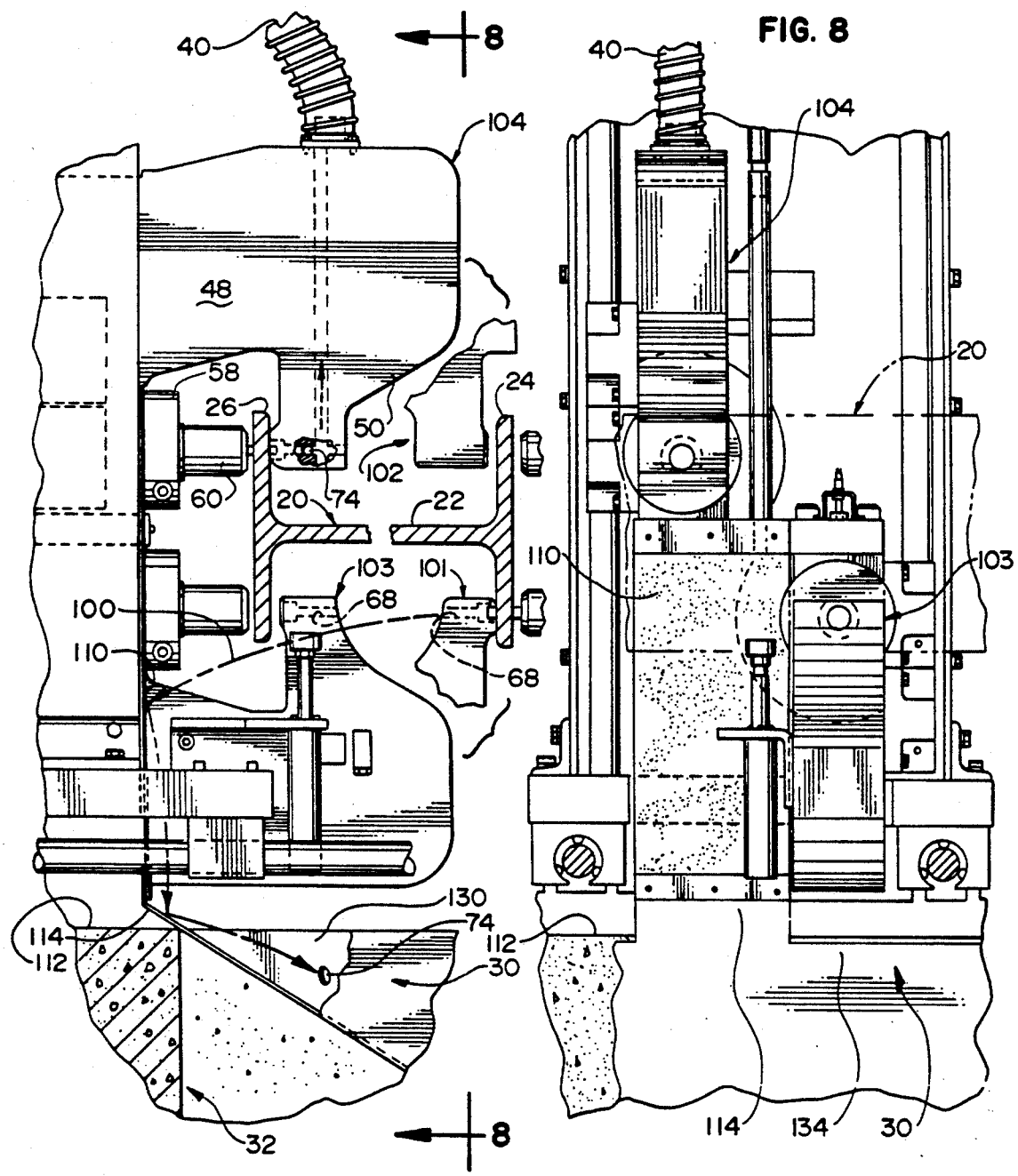

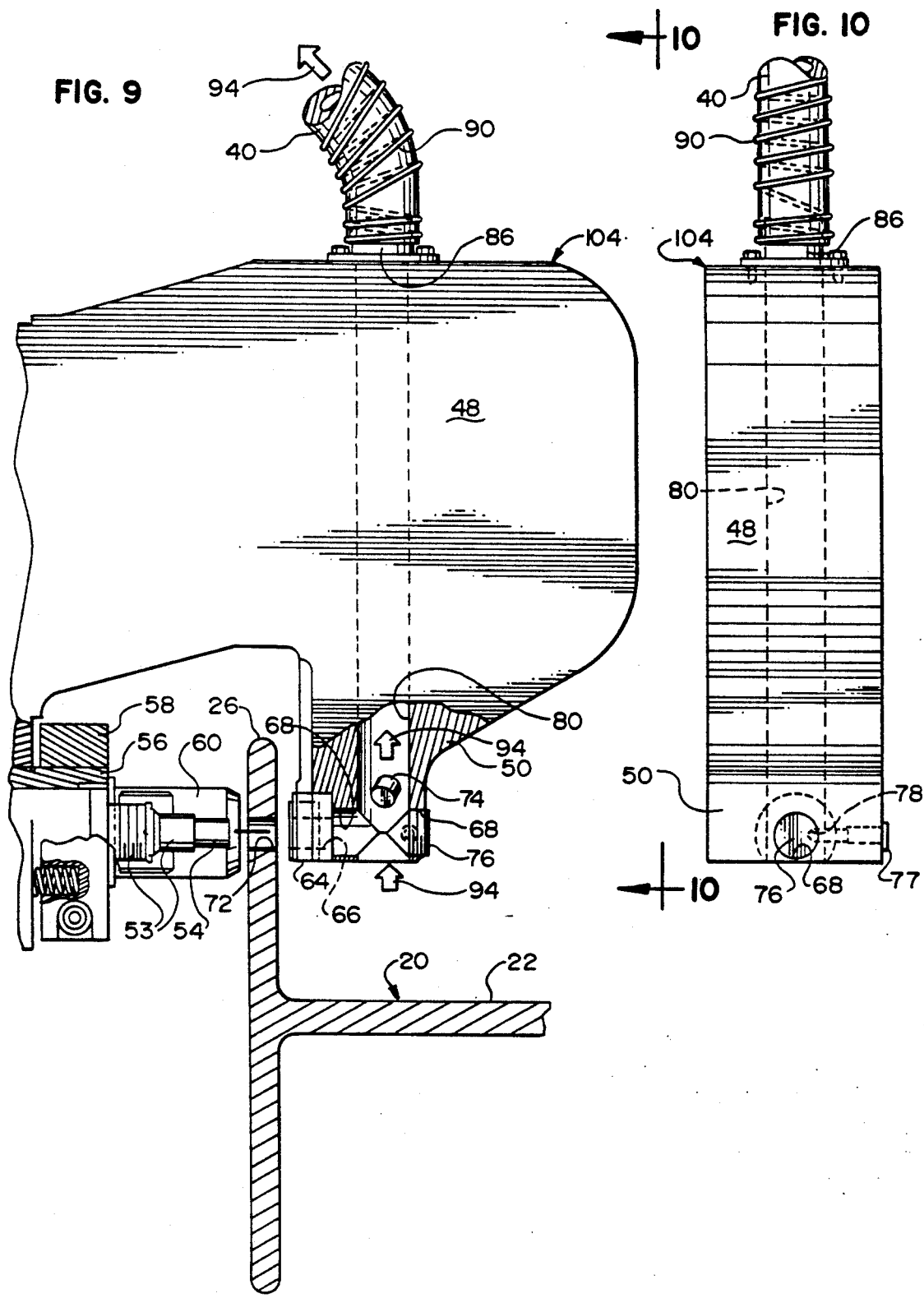

PUNCH PRESS SLUG REMOVAL SYSTEM

TECHNICAL FIELD

The present invention relates to a system for removing or processing metal slugs constituting waste material formed when holes are punched in a workpiece by a punch press. The present invention is particularly suitable for use with large assemblies of punch presses that operate automatically on large structural steel shapes, such as structural beams, for providing bolt holes to accommodate fasteners during the erection of a structure incorporating such beams.

BACKGROUND OF THE INVENTION AND TECHNICAL PROBLEMS POSED BY THE PRIOR ART

Punch press systems are typically employed by structural steel fabricators which receive structural beams from mills and which fabricate the finished beams by cutting the beams to finished lengths and punching the necessary holes in the beams.

A commercially successful structural beam punch press system is marketed in the United States of American by Peddinghaus Corporation, 300 North Washington Avenue, Bradley, Ill. 60915 U.S.A. under the trade name "Beamline" as part of the structural steel fabrication lien sold under the trade name "Fabriline." This prior art system is described on pages 10 and 11 of the catalog entitled "Peddinghaus PEDDIMAT Structural Fabrications Systems for Economical Structural Steel Fabrication" published by Peddinghaus Corporation and bearing, on the last page, the designation "683 GC5M."

Another punch press system, which incorporates a number of novel features and provides a number of operational advantages, has been recently developed by Peddinghaus Corporation. It is illustrated in a greatly simplified manner in FIG. 1 and is described in detail in U.S. Pat. No. 5,063,804. This recently developed punch press assembly, as well as other punch press assemblies, are typically operated substantially automatically. Structural beams are usually conveyed or indexed through the assembly of punch presses which punch holes in the beams. The beams that are processed in this manner have a central web, which is usually oriented generally horizontally in the punch press assembly, and two parallel flanges —one flange at each end of the web. The flanges are generally perpendicular to the web and are oriented generally vertically in the punch press assembly.

Such beams are typically designated as "I" beams, wide flange beams, light beams, and American Standard beams. When such beams are erected in structures, the ends of the beams and/or other portions of the beams are typically connected together with bolts. The bolts are received in holes provide din the webs and flanges of the beams.

The beam punch press system assemblies typically include a number of punch presses for punching the bolt holes in the beams. "Web" punch presses are used to provide hole sin the beam web, and "flange" punch presses are used to provide holes in the beam flanges. The punch presses typically include, among other things, a punch, a coacting die against which the punch forces the beam flange or web, and a punch actuator. Conventional designs for such components are well-known to those skilled in the art. Various designs are disclosed in U.S. Pat. Nos. 4,631,996, 3,722,337, and 3,720,125.

In the punch press assembly illustrated in FIG. 1, a beam 20 is conveyed in a generally horizontal orientation and has a horizontal web 22, a front flange 24, and a rear flange 26. The beam 20 is moved lengthwise into position toward, through, and beyond the punch press assembly by suitable special or conventional beam conveying means (not illustrated), such as conveyors or workpiece advancing mechanisms, which are well-known to those skilled in the art. For ease of illustration, such beam conveying means have not been shown in the figures, and the details of such beam conveying means form no part of the present invention.

The punch press assembly shown in FIG. 1 includes four substantially identical punch presses, designated 101, 102, 103, and 104, the design and operation of which are described in U.S. Pat. No. 5,063,804. Briefly, the punch presses are arranged in pairs. The first pair of presses consists of a first press 101 and a second press 102 located to punch the beam front flange 24 from a front side of the beam 20. The first punch press 101 punches the front flange 24 below the web 22, and the second punch press 102 punches the front flange 24 above the web 22.

The second pair of punch presses consists of a first press 103 and a second press 104 which are located to punch the rear flange 26 from the rear side of the beam 20. The first punch press 103 of the second pair punches the rear flange 26 below the web 22, and the second punch press 104 of the second pair punches the rear flange 26 below the web 22.

Typically, at least one conventional web punch 105 is also provided, upstream or downstream of the flange presses 101, 102, 103, and 104, for punching holes in the beam web 22.

When one of the punch presses is operated to punch a hole in the adjacent beam, a disk-like slug of metal is punched out of the beam. The slug falls from, or is ejected from, the punch press. The slug may be ejected with considerable force or may just drop away from the punch press. In any event, the slug is ultimately discharged from the punch press.

In the case of a typical beam flange punch press, such as any of the presses 101, 102, 103, and 104, the die portion of the press extends inwardly beyond the beam flange. The punch and actuator mechanism of the press are mounted to the side of the beam outwardly of the beam flange. The end of the punch per se moves from the outside of the beam centerline. The slug that is produced by this punching operation is thus discharged toward the beam centerline.

For the flange punch presses 102 and 104 that punch holes in the upper parts of the flanges above the beam web, the slugs typically end up falling on top of the beam web and are carried along on the beam web as it passes through the punch press assembly. The slugs carried on the beam can present problems.

For example, the fabrication process may require the beam to be subsequently repositioned to permit another hole to be punched by one of the flange punches (or by the web punch 105). In such a situation, slugs discharged from previously punched holes may lie at locations on the web and/or against a flange that interfere with the subsequent punching operations.

Even if the slugs do not interfere with subsequent punching operations, the slugs are carried with the beam as the beam is transported through other beam processing systems in the fabrication process. The slugs can interfere with such other subsequent processing systems and/or ultimately fall off of the ends of the beam at various locations around the fabricating plant.

The undesirable scattering of slugs around a plant is further aggravated by the fact that the slugs have a generally cylindrical shape. Thus, the slugs tend to roll easily along the beam, as well as along the floors or other equipment on which the slugs may fall.

The punch presses that punch holes in the lower parts of the flanges below the beam web 22, such as the punch presses 101 and 103, necessarily discharge the slugs below the beam 20. The web punch press 105 also is typically oriented with the punch die portion or bolster located below the beam and with the punch located above the beam so that the slug is discharged below the web into the region below the beam 20. Although these slugs do not get carried along on the beam web 22, they can get ejected into, or can roll along or in, the punch press assembly frame components below the beam 20. Some of the slugs can roll along the floor and become lodged in equipment support bases or mounting rails.

Another problem with the slugs produced by the punching process is that a slug may be ejected from a punch press at a relatively high velocity. The slug may have a relatively high rate of speed and be capable of generating a high impact force.

Some of the slugs may weigh up to about ⅓ of a pound. The energy released during the punching process, some of which is converted to the kinetic energy of the ejected slug, can be significant, especially when punching large diameter holes in thick flanges of high strength steel beams. The high kinetic energy of some slugs thus increases the probability that the slugs will be carried a significant distance where they may interfere with other parts of the punch press assembly (or with other equipment), or otherwise be scattered about the area in a way that exacerbates collection and disposal.

In view of the above-described problems, it would be desirable to provide a system for removing slugs form the punch press assembly area.

It would be particularly advantageous to provide means for collecting slugs that might otherwise fall on top of the beam web as well as for collecting slugs that would otherwise be randomly discharged below the beam web.

It would also be beneficial if a system could be provided for efficiently collecting such slugs, especially relatively heavy slugs, in a manner that would require little or no human operator intervention.

It would be advantageous to provide such a collection system with means for effectively operating in a substantially automatic manner to remove slugs as they are produced by the punch presses. Such an improved assembly should accommodate slugs that are relatively heavy and slugs that are ejected at relatively high kinetic energies.

The present invention provides a novel system for preventing problems associated with punch press slug ejection and for efficiently collecting such slugs. The present invention can accommodate designs having the above-discussed benefits and features.

SUMMARY OF THE INVENTION

According to one aspect of the invention, a method is provided for removing slugs form a punch press of the type having a die that material is force against by a punch and that defines a first hole having an inlet opening to accommodate the passage of a slug of material punched through the inlet opening into the first hole. The method includes the step of establishing a flow passage communicating between the first hole and a remote deposit location. Pressure is reduced in the passage at the remote deposit location to create an air stream for entraining the slug in the first hole and transporting it to the remote deposit location.

Another aspect of the invention relates to a modified system for removing slugs ejected from, and falling from, a punch press. An intermediate collection pan is provided adjacent the punch press and has an opening for receiving slugs ejected from the punch press. A conduit means is connected to the pan for defining a passage to a remote deposit location. A pressure reducing means is provided in operable communication with the conduit means at the remote deposit location for reducing the pressure within the conduit means to create an air stream for entraining the slugs at the pan and transporting them from the pan to the remote deposit location.

Another aspect of the invention process relates to the removal of a slug from a punch press of the type having a die against which material is forced by a punch and having a chute means in the die for accommodating the gravity discharge of a slug of material punched into the die. The slug is collected in an intermediate collection pan as the slug falls form the press chute means. A flow passage is established to communicate between the collection pan and a remote deposit location. Pressure is reduced within the passage at the remote deposit location to create an air stream for entraining the slug at the collection pan and transporting it to the remote deposit location.

In another form of the invention, a unique arrangement of apparatus is provided for removing slugs from a punch press of the specific type having a die against which material is forced by a punch. A first blind hole is provided in a portion of the die, and the blind hole has an inlet opening to accommodate the passage of a slug of the material punched through the inlet opening into the first hole. A second hole extends into the die and intersects the first hole. A conduit means is connected to the second hole for defining a passage to a remote deposit location. A pressure reducing means is operably connected for communication with the conduit means at the remote deposit location for reducing the pressure within (1) the conduit means, (2) the second hole, and (3) the first hole so as to create an air stream for entraining the slug and transporting it from the first hole to the remote deposit location.

The present invention can also be embodied in a system for removing slugs from a punch press of the type having a die that material is forced against by a punch and that defines a first hole having inlet and exit openings to accommodate the passage of the slug of material punched through the inlet opening. A second hole is provided in a portion of the die to intersect the first hole. A plug means is provided for occluding the first hole between the first hole exit opening and the second hole. A conduit means is connected to the second hole for defining a passage to a remote deposit location. A pressure reducing means is operably connected for communication with the conduit means at the remote deposit location for reducing the pressure within (1) the conduit means, (2) the second hole, and (3) the first hole so as to create an air stream for entraining the slug and transporting it from the first hole to the remote deposit location.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 5 is a simplified, end elevational view taken generally along the plane 5—5 in FIG. 3 with portions of the floor cut away to illustrate the slug collection pit;

FIG. 6 is a simplified, fragmentary, perspective view of the collection pit area;

FIG. 7 is a greatly enlarged, fragmentary, partial, cross-sectional view taken generally along the plane 7—7 in FIG. 5;

FIG. 8 is a view taken generally along the plane 8—8 in FIG. 7 with the beam shown in phantom to better reveal structural detail;

FIG. 9 is an even more greatly enlarged view of one of the punch presses in FIG. 7 shown with portions of the structure cut away to better illustrate interior detail and showing the punch in operation;

FIG. 10 is an end view taken generally along the plane 10—10 in FIG. 9;

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the punch press slug removal systems of this invention are described in the normal (upright) operating position, and terms such as upper, lower, horizontal, etc., are used with reference to this position. It will be understood, however, that the punch press slug removal systems of this invention may be manufactured, stored, transported, and sold in orientations other than those described.

Some of the figures illustrating an embodiment of the system apparatus show structural details and mechanical elements that will be recognized by one skilled in the art. However, the detailed descriptions of such elements are not necessary to an understanding of the invention, and accordingly, are not herein presented.

The apparatus of this invention is used with certain conventional components, including some actuators, control systems, and mechanisms, the details of which, although not fully illustrated or described, will be apparent to those having skill in the art and an understanding of the necessary functions of such components.

Figure 1:
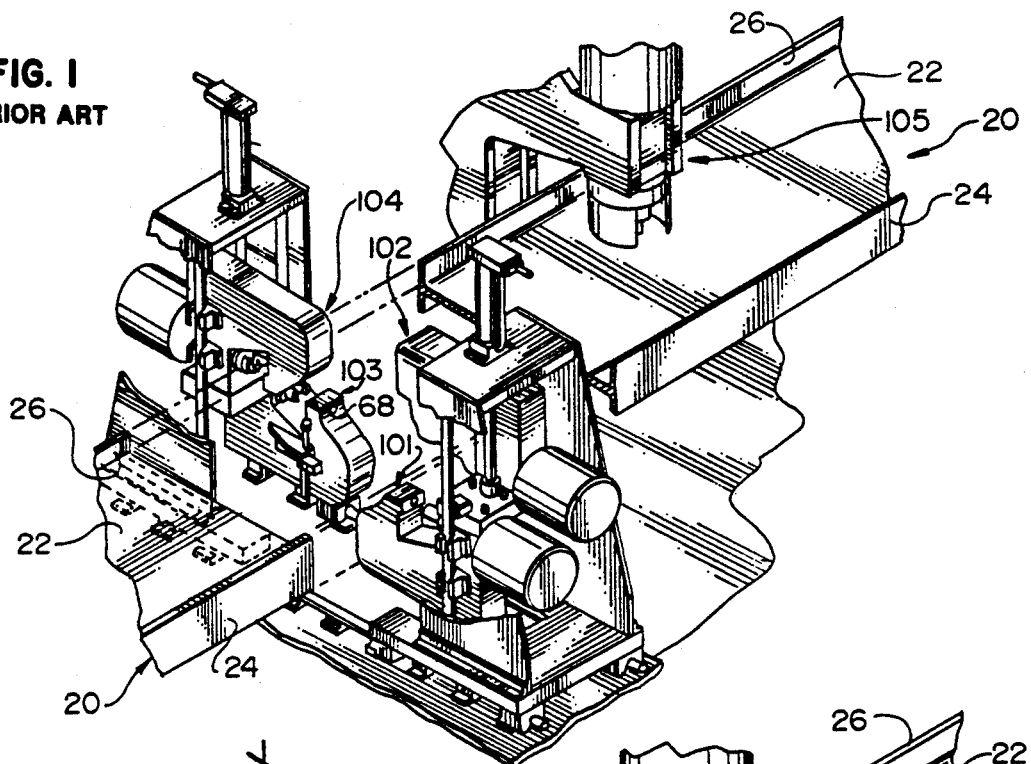
FIG. 1 is a simplified, perspective view of one type of punch press assembly shown with four flange punch presses positioned at spaced-apart orientations across the width of a structural beam for accommodating the structural beam and shown with a web punch press spaced rearwardly of the flange punch presses.

Conventional punch presses can be modified to operate according to the principles of the present invention. As an example of such a modification, the conventional punch press assembly illustrated in FIG. 1 is modified, and provided with additional cooperating components, as illustrated in FIGS. 2-13.

Figure 3:
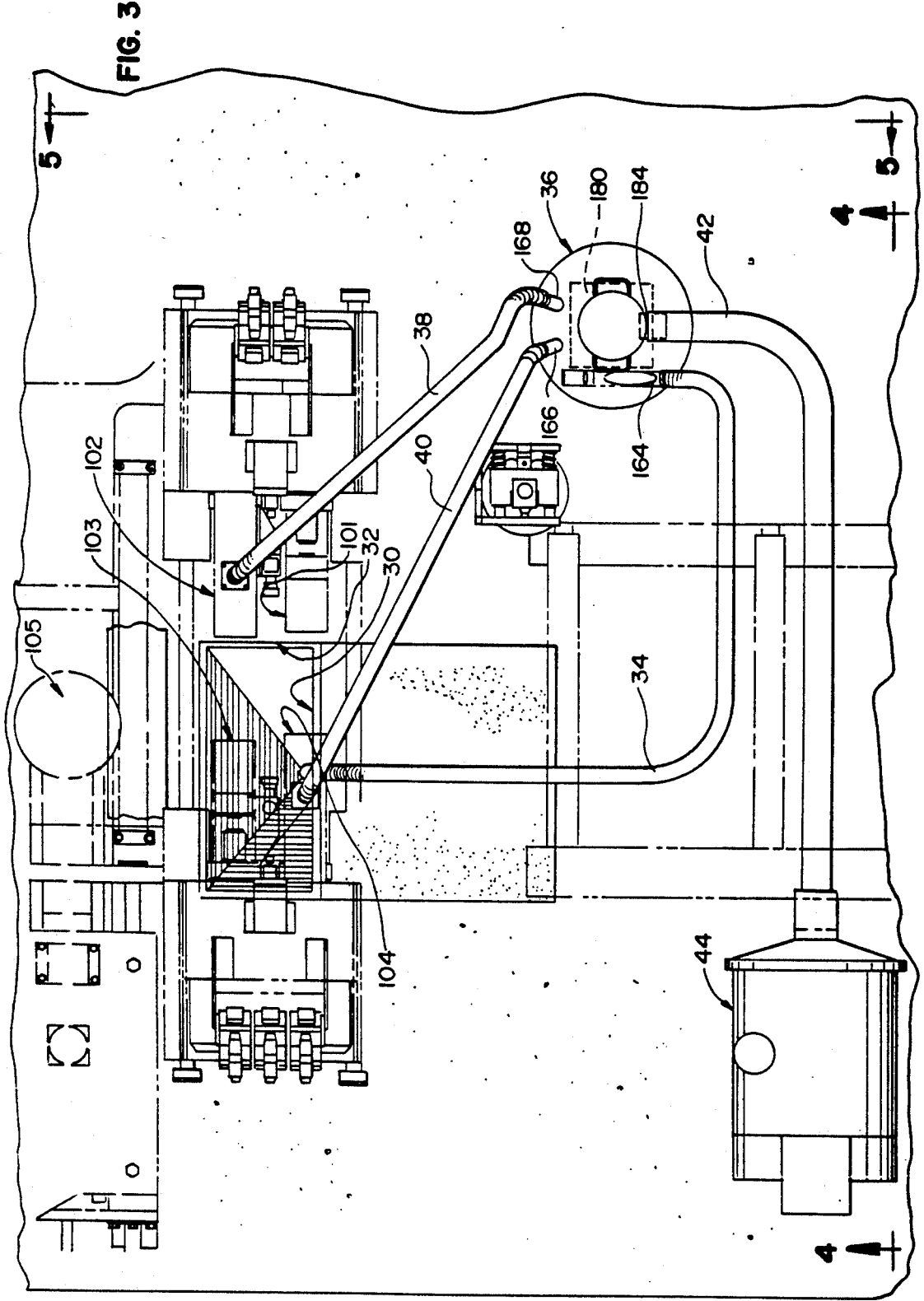
FIG. 3 is a plan view taken generally along the plane 3—3 in FIG. 2 with the beam omitted for ease of illustration and with the punch press assembly shown in phantom to better illustrate underlying detail.
Figure 4:
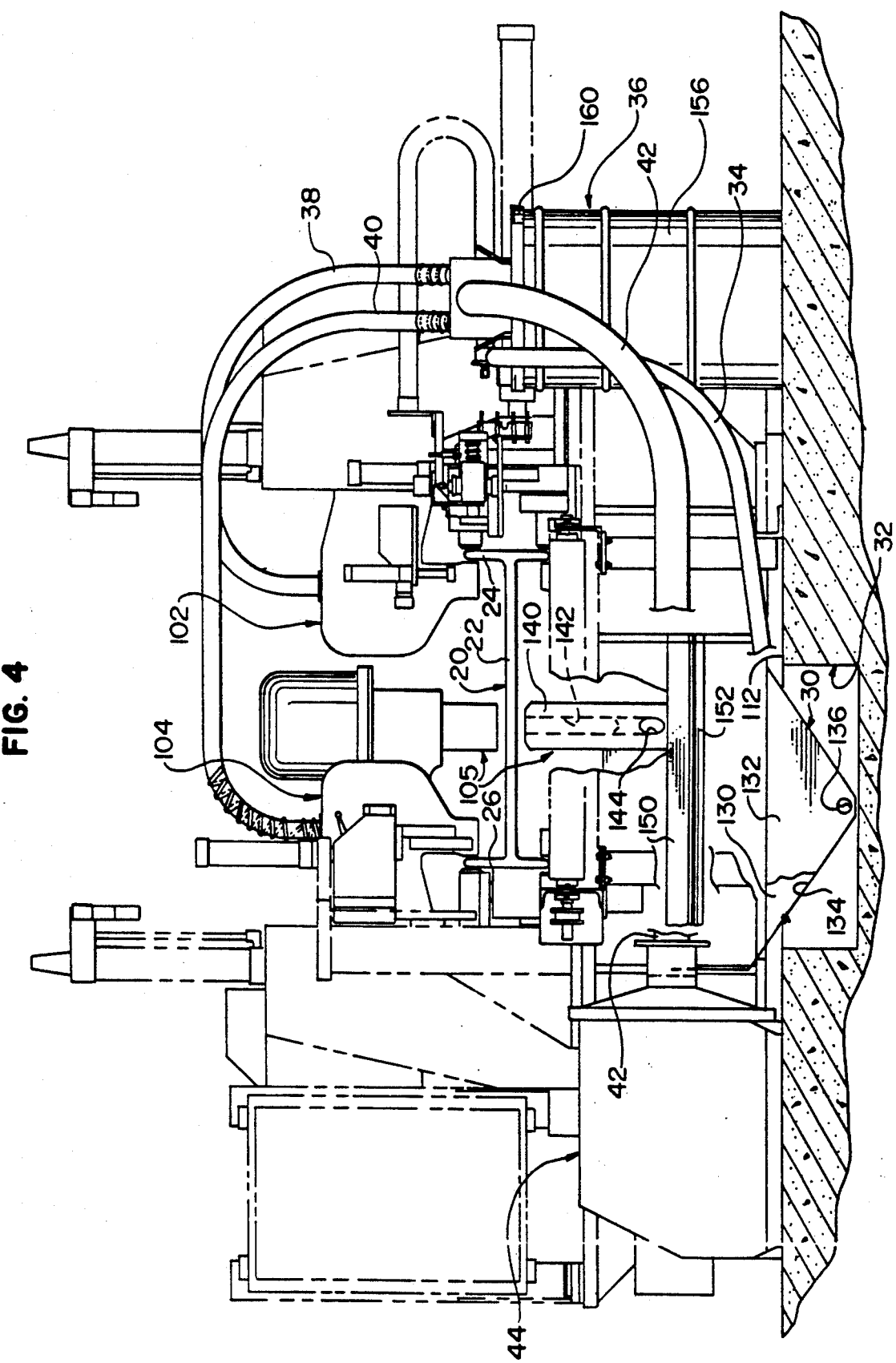
FIG. 4 is a simplified, side elevational view taken generally along the plane 4—4 in FIG. 3 with portions of the floor cut away to illustrate the slug collection pit.

Briefly, as can be seen in FIGS. 3, 4, and 5, a slug collection pan 30 is provided in a pit 32 below the assembly of punch presses. As is explained in more detail hereinafter, the slugs punched by the web punch press 105, lower rear flange punch press 103, and lower front flange punch press 101 are temporarily received in the pan 30.

The collection pan 30 is connected, through a vacuum hose 34, to a slug collection receptacle 36 which is located at a deposit location remote from the collection pan 30. The receptacle 36 is also connected with a hose 38 to the front, upper flange punch press 102 and is connected with a hose 40 to the rear, upper flange punch press 104.

The receptacle 36 is also connected with a hose 42 to a pressure reducing means 44 which, in the preferred form of the invention illustrated, is a compressor having an intake operably connected to the hose 42 to draw a partial vacuum through the hose 42 and in the receptacle 36. As will be explained in more detail hereinafter, the slugs punched by the presses are carried by the hoses, under the influence of the reduced pressure created by the compressor 44, to the receptacle 36.

The collection of slugs from the upper flange punch presses 102 and 104 is accomplished in a way that is significantly different from the manner in which slugs are connected from the lower flange punch presses 101 and 103 or from the web punch press 105. Indeed, in order to collect slugs from conventionally designed upper flange punch presses, the conventional designs of the punch presses 102 and 104 must be modified in a novel manner as will next be explained.

FIGS. 9 and 10 illustrate in detail the modification to a conventional punch press 104 that is typically employed in punching the beam upper flange (such as the upper rear flange 26 as illustrated in FIG. 9). The punch press 104 illustrated in FIGS. 9 and 10 is initially fabricated according to a conventional design employed in the previously identified "Beamline" punch press system and which is generally disclosed in the U.S. Pat. No. 4,631,996 which is assigned to the assignee of the present invention.

Briefly, the punch press 104 includes a C-shaped frame 48 with a work piece supporting area or die portion generally designated by the reference numeral 50 against which the beam flange is forced and supported during the punching operation.

Figure 2:
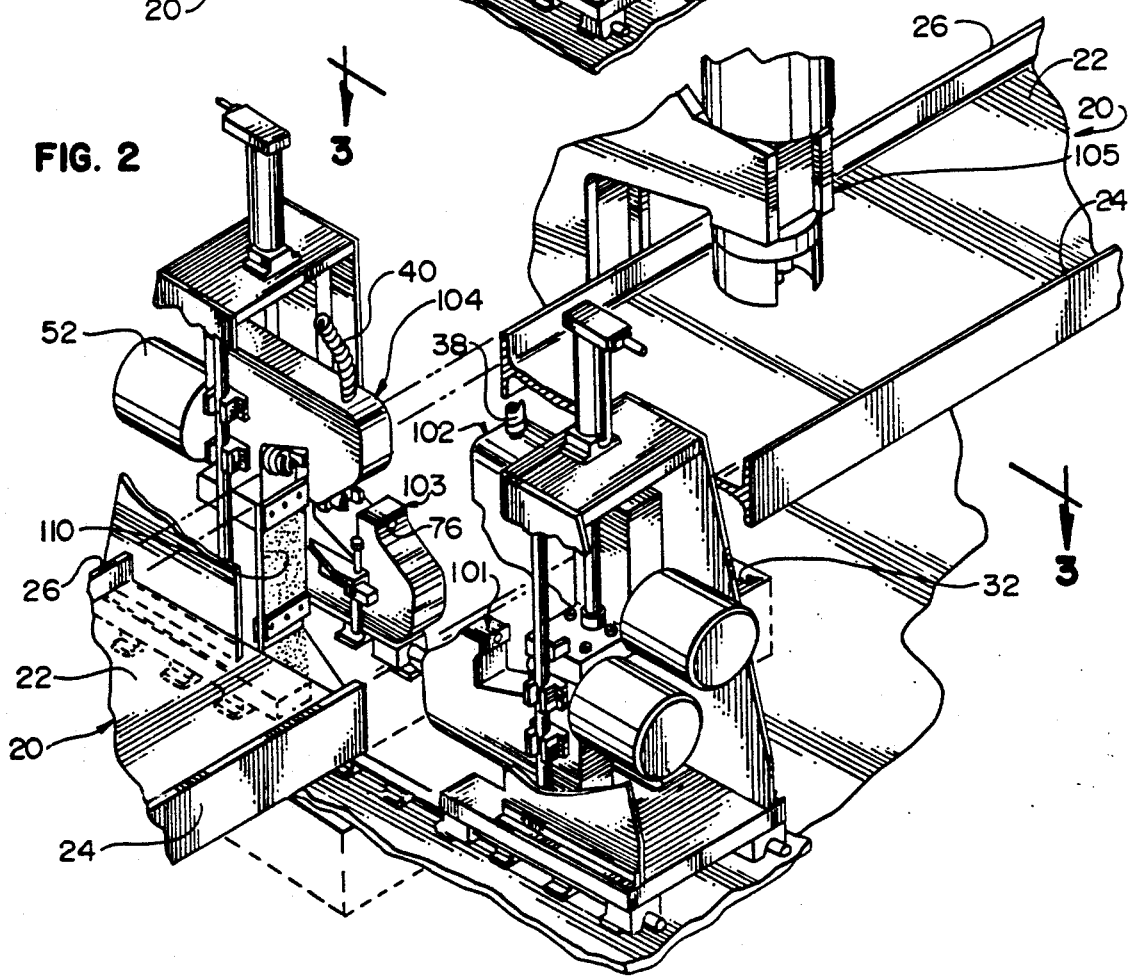
FIG. 2 is a perspective view, similar to FIG. 1, of the punch press assembly shown with modifications and with additional components in accordance with teachings of the present invention.

The punch press 104 also includes a selectively operable, double-acting, fluid actuator generally indicated by the reference numeral 52 in FIG. 2. The actuator 52 is configured for operation by pressurized hydraulic fluid, and the actuator 52 includes a conventional reciprocable piston (not visible). the piston has a rod with a front end portion 53 extending forwardly through a sleeve bushing 56 (FIG. 9) mounted within the C-shaped frame 48. A punch tool or punch member 54 extends forwardly from the piston rod end portion 53.

A locking ring 58 is mounted on the outer end of the sleeve bushing 56 and carries a stripper which includes a pair of spaced-apart clamping portions or stripping members 60 (only the far side stripping member 60 being visible in FIG. 9, while the near side stripping member 60 is visible in FIG. 7).

When the punch press 104 is not being operated to punch a hole in the beam flange 26, a running clearance is provided on each side of the beam flange 26 to accommodate conveying of the beam 20 through the punch press assembly. In particular, a running clearance is provided on one side of the flange 26 by a space between the distal end of the stripper members 60 and the flange 26, and a running clearance is provided on the other side of the beam flange 26 by a space between the flange 26 and the die portion 50. In a conventional punch press of the type illustrated, the C-shape frame 48 is characterized as floating around the beam flange to provide a running clearance of about ¼".

When the punch press 104 is operated to punch a hole in the beam flange 26, the running clearance between the beam flange 26 and the C-shaped frame die portion 50 is eliminated by moving the frame 48 outwardly away from the beam centerline so that the die portion 50 engages the inside of the beam flange 26. The die portion 50 includes a die member or members 64 which define an inlet opening into a first hole defined by two axially aligned bores: a bore 66 that communicates with a larger bore 68 defined further inwardly in the die portion 50. The aligned bores 66 and 68 are generally in alignment with the punch tool 54.

In a conventional punch press of the type described above, the bore 68 extends through the die portion 50 of the frame 48 to form a through hole known as a "slug-out" hole. In a conventional punch press of this type the press is operated by providing pressurized hydraulic fluid to the actuator 52 (visible only in FIG. 2) to drive the punch tool 54 into the beam flange 26 for punching a hole 72 i the beam flange 26. The punching process forms a slug 74 (FIG. 9) which, in a conventional punch press, would be expelled from the bore 68 over and/or onto the beam web 22. However, according to the present invention, the conventional slug-out hole or bore 68 is plugged with a suitable plug 76 (FIG. 9). Preferably, the plug 76 is retained within the exit opening of the bore 68 with a suitable set screw 77 (FIG. 10) which is received in a suitable hole in the side of the frame 48 and which has a distal end extending into a receiving cavity 78 in the side of the plug 76. Alternatively, the slug-out bore 68 could be provided at its distal, outlet end with an internal, female thread for threadingly engaging a cooperating male thread on the plug 76.

In addition, according to the present invention, the die portion 50 is provided with a second hole 80 which intersects the first hole bore 68. In the preferred arrangement, the hole 80 is a through hole that (1) extends from the top of the C-shaped frame 48, (2) passes perpendicularly through the first hole bore 68, and (3) opens at the bottom of the frame 48.

At the top of the frame 48, a flange fitting 86 is mounted over the outlet opening of the second hole 80, and the hose 40 is mounted over the fitting 86. Preferably, the hose 40 is secured to the fitting by suitable means, such as with a suitable conventional hose clamp (not illustrated). In addition, to relieve stress on the hose 40, a spring 90 is disposed around the hose at the fitting 86. This accommodates flexing of the end of the hose 40 during movement of the punch press 104 when the punch press moves inwardly or outwardly relative to the beam centerline to accommodate beams of different widths.

With the exception of the above-described addition of the plug 76 to the die first hole bore 68 and the addition of the second hole 80, the detailed design and operation of the other components of the punch press punch 104, along with the supporting components and actuating system, may be of any suitable special or conventional design, the details of which form no part of the present invention.

The reduced pressure or partial vacuum created by the pressure reducing means 44 is effective from the receptacle 36 through the hose 40 to the punch press bore 80 for creating a flow of air through the second hole 80 as indicated schematically by the arrows 94 in FIG. 9. The air flow entrains the slug 74 and carries the slug 74 through the hose 40 to the receptacle 36 where it is collected with slugs from the other punch presses.

It will be appreciated that a special punch press, similar to the punch press 104, could be initially fabricated with a slug-receiving bore 68 that does not extend completely through the die portion 50. That is, the first hole bore 68 could be provided as a blind hole terminating at the intersecting second hole 80. This would eliminate having to provide a special plug 76 to occlude the exit opening of the bore 68.

It will also be appreciated that, in some applications, the second hole 80 need not necessarily extend through the die portion 50 and open at the bottom of the die portion 50. However, in general, it is preferably that the second bore 80 be open at the bottom of the die portion 50 to ensure that a sufficient quantity of air is admitted to the hole 80 for creating a high velocity air stream to effectively entrain the slug 74.

The capability for admitting air from the bottom of the frame 48 into the second hole 80 may be needed especially when relatively thick flange are punched. A slug 74 from a thick flange might remain within the bore 66 or 68 in an orientation that would prevent any substantial air flow through the inlet bore 66. If the vertical hole 80 were not open at the bottom of the die portion 50, then the amount of air flowing through the bore 66, bore 68, and hole 80 might not be sufficient to effectively entrain the slug 74 and carry it out of the punch press to the receptacle 36.

The upper, front flange punch press 102 is preferably provided with the same structure for entraining slugs as employed in the upper, rear flange punch press 104 described in detail above. The hose 38 extending from the top of the upper, front flange punch press 102 functions as a conduit means or conduit, in the same manner as the above-described hose 40, for carrying slugs entrained n an air stream to the receptacle 36.

The lower, front flange punch press 101 and the lower, rear flange punch pres 103, in the preferred form of the invention, may be conventional punch presses which have conventional slug-out holes 68 as illustrated in FIG. 7. The slugs 74 which are punched by the presses 101 and 103 are ejected from the slug-out holes generally horizontally and begin to fall downwardly toward the lower portions of the punch press assembly as illustrated by the dashed trajectory lien 100 of the slug in FIG. 7. The slugs 74 are temporarily collected in the intermediate collection pan 30.

Typically, each of the two upper flange punch presses is preferably provided with a novel protective barrier or deflector member, such as a rubber shield 110 which is mounted to the bottom of the C-shaped frame of the upper, rear flange punch press 104 as illustrated in FIGS. 2 and 7. The rubber shield 110 hangs below the upper, rear flange punch press 104 and absorbs some of the impact of a slug ejected from the oppositely facing, lower, front flange punch press 101. The shield 110 prevents the slug from flying beyond the edge of the pan 30 onto the floor in the region below the upper, rear flange punch press 104. As shown in FIGS. 5, 6 and 7, the rubber shield 110 extends downwardly to just above the floor 112 where it overlaps an angle member 114 extending into the top edge of the intermediate collection pan 30.

In a typical installation contemplated by the present invention, a second rubber shield, similar to the shield 110, would be similarly mounted to the upper, front flange punch press 102 (but this has not been shown for ease of illustration). However, the bottom of the shield would not be restrained and would be free to move with the upper, front flange punch press 102. Such a second shield would deflect slugs ejected from the lower, rear flange punch press 103.

In the punch press arrangement illustrated, the upper, rear flange punch press 104 (along with the lower, rear flange punch press 103) undergoes no substantial lateral movement to accommodate beams having various widths. The sides of the beams, such as beam 20, are typically aligned at, and conveyed along, the rear flange punch presses 103 and 104. On the other hand, the front flange punch presses 101 and 102 are conventionally adapted to move laterally, over substantial distances, toward and away from the beam centerline to accommodate narrow beams and wide beams.

FIGS. 3 and 4 show the front flange punch presses 101 and 102 moved laterally to the positions where they are located at the maximum or widest spacing from the rear flange punch presses 103 and 104. As illustrated in FIGS. 3 and 4, the intermediate collection pan 30 extends laterally almost as far as the location of the front flange punch presses 101 and 102 at their widest spacing from the rear flange punch presses 103 and 104. However, it is clear from FIGS. 3 and 4 that the other end of the intermediate collection pan 30 extends for a substantial distance under the rear flange punch presses 103 and 104.

When the punch presses are at the widest spacing as shown in FIGS. 3 and 4 for punching a wide beam, the slugs punched from the lower, front flange will be ejected by the press 101 outwardly into the pit. Because the beam is so wide, the slug ejected from the lower, front flange punch press 101 will usually not carry all the way to the rubber shield 110 hanging from the upper, rear flange punch press 104. Rather, the slug ejected from the lower, front flange punch press 101 will fall directly into the collection pan 30. Similarly, the slug ejected from the lower, rear flange punch press 103 will usually not have enough energy to clear the collection pan 30, and the slug will drop into the collection pan 30. However, in some cases (depending upon, inter alia, the pit size, beam size, type of steel, and power of the punch press), slugs ejected from either lower flange punch press 101 or 103 could fly all the way to the opposing rubber shield which would stop the slug at that point.

On the other hand, when a small (narrow) beam is being punched, the front flange punch presses 101 and 102 are moved very close to, and in an offset and overlapping relationship with, the rear flange punch presses 103 and 104. At the closest possible spacing for punching the narrowest beam, the front flange punch presses 101 and 102 will extend inwardly over the collection pan 30. Also, the lower, front flange punch press 101 will project beneath the upper, rear flange punch press 104, while the lower, rear flange punch press 103 will project beneath the upper, front flange punch press 102. The slugs ejected from the lower, front flange punch press 101 and from lower, rear flange punch press 103 will be directed against, and stopped by, the rubber shields mounted to, and extending downwardly below, the bottom of the upper, rear flange punch pres 104 and the bottom of the upper, front flange punch press 102, respectively. The slugs will fall away from the rubber shields into the collection pan 30.

The use of the rubber shields, such as shield 110, as accommodates the movement of the front flange punch presses 101 and 102 to the location for punching the narrowest beam. Specifically, when the lower, front flange punch press 101 is moved into the overlapping relationship adjacent the lower, rear flange punch press 103 and below the upper, rear flange punch press 104, the innermost end of the lower, front flange punch press 101 may engage the rubber shield 110 and deflect the rubber shield 110 slightly outwardly, away from the beam 20. Similarly, the innermost end of the lower, rear flange punch press 103 may engage and deflect the rubber shield hanging from the upper, front flange punch press 102. If rigid shields were used in place of the rubber shields, then the lower, front and rear flange punch presses 101 and 103 could not be moved as far rearwardly in such an overlapping relationship, and the punch press assembly would thus not be able to accommodate beams as narrow as the beam that can be accommodated when flexible, rubber shields are employed.

As best illustrated in FIG. 6, the intermediate collection pan 30 includes a downwardly slanting rear wall 130, two sloping side walls 134, and a generally vertically oriented front wall 132. The sloping rear wall 130 and sloping side walls 134 thus define a central accumulation region adjacent the front wall 132.

As best illustrated in FIG. 5, a conduit 136 is mounted through the pan front wall 132 and includes an upwardly angled distal end 138 within the pan 30 over the central accumulation region. The end of the conduit 136 extending outwardly of the collection pan 30 is connected to the flexible hose 34 (e.g., with a suitable hose clamp (not illustrated)) and extends back to the receptacle 36.

The partial vacuum or reduced pressure drawn by the compressor 44 in the receptacle 36 causes air to be entrained into the upper opening of the collection pan 30 and through the hose 34. This serves to carry the slugs from the collection pan 30 through the hose 34 to the receptacle 36.

The beam web punch press 105 also ejects slugs which are temporarily received in the intermediate collection pan 30. The web punch 105, and the structure for guiding the slugs to the collection pan 30 are illustrated in FIGS. 3, 4, and 5. The web punch 105 includes a die portion or die bolster 140 (FIGS. 4 and 5) below the beam web 22. The die portion or bolster 140 defines a slug-out hole having a first, vertical portion 142 (FIG. 5) an a second, angled portion 144 extending from the bottom of the vertical portion 142. The slug-out hole angled portion 144 opens to the side of the die portion 140 under the beam web 22 as illustrated in FIG. 4. The web punch press 105 ha a punch tool 148 (FIG. 5) which, in operation, moves downwardly to punch a hole in the web and create a slug which falls through the slug-out hole portions 142 and 144.

The structure of the web punch 105, including the die portion 140, insofar as it has been described, is of conventional design. Normally, the slug would be discharged from the slug-out hole angled portion 144 and would fall onto the floor below the web punch press 105. However, according to the present invention, a slide plate 150 is disposed in an angled orientation below the elevation of the bottom, outlet opening of the slug-out hole angled portion 144 as best illustrate in FIGS. 4 and 5. The slide plate 150 is mounted with a vertical bracket plate 152 to suitable vertical support members or surfaces of components in the lower region adjacent the web punch 105.

As can be seen in FIG. 5, the slide plate 150 angels downwardly toward the rear edge of the collection pan 30. Slugs that are discharged from the web punch slug-out hole portion 144 slide along the slide plate 150 and off of the plate 150 in the trajectories that carry them into the collection pan 30. The slugs received from the web punch 105 in the collection pan 30 are carried, along with the slugs received from the lower flange punches 101 and 103, through the hose 34 to the receptacle 36.

Figure 11:
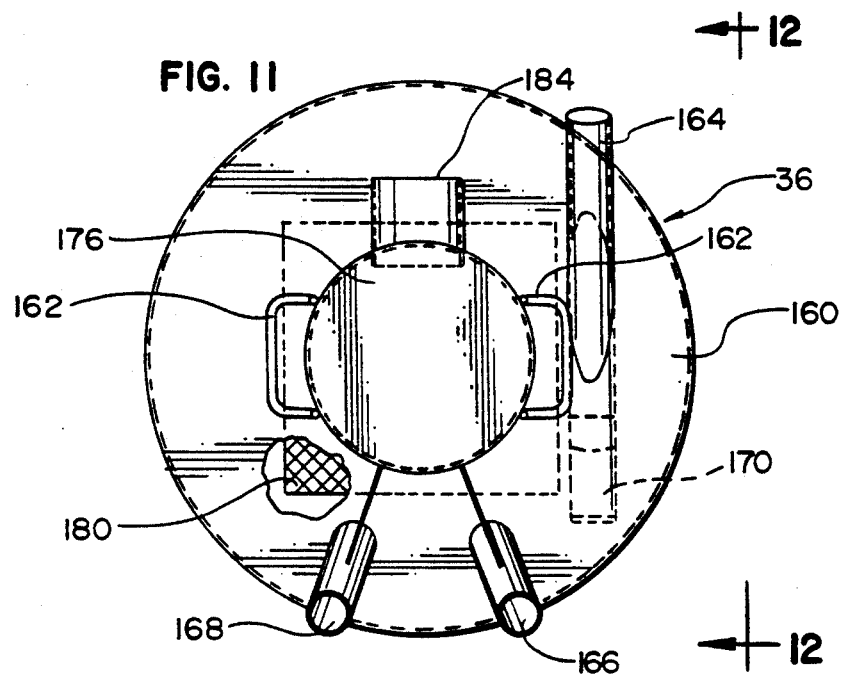
FIG. 11 is a top, plan view of the slug collection receptacle shown with the connecting hoses omitted for each of illustration and shown with portions of the structure cut away to better illustrate interior detail.
Figure 12:
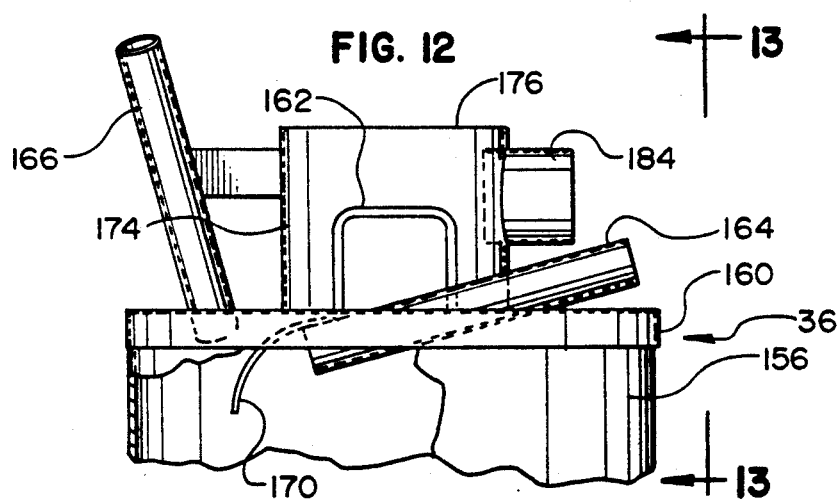
FIG. 12 is a fragmentary, side elevational view taken generally along the plane 12—12 in FIG. 11 with portions of the structure cut away to better illustrate interior detail.
Figure 13:
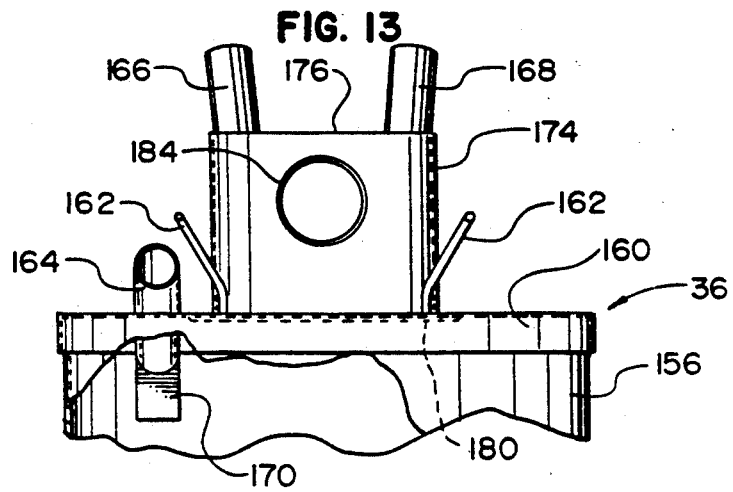
FIG. 13 is a side elevational view taken generally along the plane 13—13 in FIG. 12 with portions of the structure cut away to illustrate interior detail.

The receptacle 36 includes a number of novel structures for effectively and efficiently receiving and holding the slugs carried to it within the hoses 34, 38, and 40. The receptacle 36, in the preferred form illustrated, includes a 55 gallon drum 156 which has an 18 gage steel body and bottom head. The receptacle 36 includes a novel cover 160 as best illustrated in FIGS. 11-13. In one suitable embodiment, the cover 160 may be fabricated from 0.12 inch thick, hot rolled, steel plate.

For facilitating removal of the cover 160 for disposal of the collected slugs, a pair of upwardly projecting handles 162 are welded, or otherwise suitably secured, to the top of the cover 160. The cover 160 also provides means for attaching the hoses 34, 38, 40 and 42 to the receptacle 36. For ease of illustration, the hoses that are normally attached to the cover 160 have been omitted from FIGS. 11-13.

The cover 160 is penetrated by a first rigid tube 164 which is connected (as shown in FIG. 3) to the hose 34 from the collection pan 30. A second tube 166 penetrates the cover 160 and is connected (as shown in FIG. 3) to the hose 40 from the upper, rear flange punch press 104. A third tube 168 penetrates the cover 160 and is connected (as shown in FIG. 3) to the hose 38 from the upper, front flange web punch 102.

In a preferred embodiment, each tube 164, 166, and 168 has a two inch outside diameter, a 0.12 inch thick wall, and is between about 13 inches and about 15 inches long. A curved deflector plate 170 is secured, as by welding, to the underside of the cover 160 adjacent the inner end of the tube 164 to effect a downward deflection of slugs carried into the receptacle 36 through the tube 164 from the collection pan 30.

The other tubes, tubes 166 and 168 from which the upper, flange punch pres slugs are discharged, are angled relatively close to the vertical, and the slugs discharging from the tubes 166 and 168 are directed generally downwardly to the bottom of the drum 156.

The center of the cover 160 defines a circular opening around which is mounted a cylindrical shell or wall 174 having a circular upper end 176. The cylindrical wall 174 on the top of the receptacle 160 is penetrated by a tube 184. The tube 184 is adapted to be connected to the hose 42 that extends between the compressor 44 and the receptacle 36 (as illustrated in FIG. 3). The central opening in the cover 160 below the cylindrical shell 174 is spanned by a square screen 180 which is secured to the inside surface of the cover around the opening. The screen 180 serves to prevent slugs from being carried out of the receptacle into the compressor 44. The screen 180 may have any suitable configuration and structure. The screen 180 may be, for example, an expanded metal (flattened), 18 gage screen having nominal ¼ inch apertures.

The hoses 164, 166, and 168 which serve as conduits for the slugs may be conventional, industrial, rubber, vacuum hoses having internal diameters suitable for the particular application parameters (e.g., the length of the hose run, the size of the slugs being carried, and the size of the pressure reducing compressor, etc.)

The hose 42 extending between the receptacle 36 and the pressure reducing compressor 44 may be a conventional, heavy duty, air transfer and vacuum hose. In a contemplated embodiment, the hose has a 4 inch internal diameter, a 14 inch minimum bend radius, and a vacuum rating of about 20 inches of mercury at 72° F.

Any suitable device may be used for reducing the pressure in the receptacle 36. In the illustrated, preferred embodiment, the pressure reducing means 44 is a compressor with its inlet end connected to the hose 42 which extends from the receptacle 36. A suitable compressor is that sold in the United States of America by Spencer Turbine Company under the catalog No. S25103B. This compressor has a rating of 300 standard cubic feet of air per minute at 4.2 inches of mercury and an inlet temperature of 70° F. The discharge pressure is 14.7 pounds per square inch. The compressor motor is a 230/460 volt, 3 phase, 60 hertz, 3500 revolutions per minute, TEFC type rated at 15 hp.

Preferably, a conventional slide gate is provided with the compressor for adjusting the air flow. Such a gate functions as a damper at the intake of the compressor to control the pressure drop to a predetermined amount that provides the best results depending upon the particular hose length, hose configurations, number of hoses, slug weight, etc.

It will be appreciated that the novel slug collection system of the present invention is readily adapted for use with one or more punch presses. The system can be used with a variety of conventional presses which can be modified as necessary and which can be assembled in a variety of orientations.

The system collects slugs that would otherwise fall on top of a beam and interfere with other punching or processing operations. Slugs are collected from above the beam, as well as below the beam, in a substantially automatic manner to prevent dispersal of the slugs around the plant.

The system operates effectively with slugs of various weights and accommodates slugs that are ejected with relatively high kinetic energies.

It will be readily apparent from the foregoing detailed description of the invention and from the illustrations thereof that numerous variations and modifications may be effected without departing from the true spirit and scope of the novel concepts or principles of this invention.

What is claimed is:

1. A system for removing slugs ejected from a plurality of punch presses, said system comprising:
    (A) an intermediate collection pan that is beneath and adjacent said punch presses, said pan having an upwardly facing opening for receiving slugs ejected from said punch presses, and said pan having a bottom sloping to a low, central, accumulation region;
    (B) conduit means connected to said accumulation region of said pan for defining a passage to a remote deposit location; and
    (C) pressure reducing means operably communicating with said conduit means at said remote deposit location for reducing the pressure within said conduit means to create an air stream for entraining said slugs as said pan and transporting them from said pan to said remote deposit location.

2. The system in accordance with claim 1 in which said collection pan is located at an elevation below said punch press.

3. The system in accordance with claim 1 in which said system further includes a slide disposed adjacent, and at an elevation below, said punch press for guiding said slugs from said punch press; and
said intermediate collection pan is disposed at an elevation below said slide for receiving said slugs from said slide.

4. The system in accordance with claim 1 in which
said intermediate collection pan includes at least one angled side wall sloping to said central accumulation region; and
said conduit means includes a hose extending into said collection pan over said accumulation region.

5. The system in accordance with claim 3 in which
a receptacle is connected to said conduit means at said remote deposit location; and
said pressure reducing means includes a compressor having an intake operably connected to said receptacle to draw a partial vacuum through said receptacle and conduit means.

6. The system in accordance with claim 3 in which said remote deposit location includes a receptacle comprising (a) a container defining a top opening, and (b) a removable cover for being mounted on said container to close said top opening.

7. The system in accordance with claim 6 in which
said cover includes a first tube mounted to, and penetrating, said cover to define a flow path into aid receptacle;
said conduit means is a flexible hose connected to said first tube;
said cover includes a second tube mounted to, and penetrating, said cover to define a flow path out of said receptacle; and
said pressure reducing means is connected to said second tube.

* * * * *